United States Patent [19]
Klein et al.

[11] Patent Number: 6,109,636
[45] Date of Patent: Aug. 29, 2000

[54] HIGH EFFICIENCY BICYCLE FRAME SUSPENSION

[75] Inventors: Gary G. Klein; Darrell W. Voss, both of Chehalis, Wash.

[73] Assignee: Klein Bicycle Corporation, Chehalis, Wash.

[21] Appl. No.: 08/519,160

[22] Filed: Aug. 25, 1995

[51] Int. Cl.[7] .................................................. B62K 25/28
[52] U.S. Cl. .......................... 280/284; 280/275; 384/229; 384/912
[58] Field of Search ..................... 280/274, 275, 280/281.1, 283, 284; 267/290, 141.1, 153, 292, 293; 384/229, 902, 908, 912

[56] References Cited

U.S. PATENT DOCUMENTS

| | | |
|---|---|---|
| 392,523 | 11/1888 | Owen . |
| 2,756,071 | 7/1956 | Riva ........................................ 280/283 |
| 4,085,832 | 4/1978 | Gaines et al. ........................ 267/293 X |
| 4,575,429 | 3/1986 | Jacobson ............................. 384/279 X |
| 5,284,354 | 2/1994 | McWethy .............................. 280/284 |
| 5,367,918 | 11/1994 | Chang et al. .......................... 280/276 |
| 5,403,028 | 4/1995 | Trimble ................................. 280/284 |
| 5,474,318 | 12/1995 | Castellano ............................. 280/284 |

FOREIGN PATENT DOCUMENTS

2 145 759   3/1973   Germany ................................ 384/297

Primary Examiner—Brian L. Johnson
Assistant Examiner—Avraham H. Lerner
Attorney, Agent, or Firm—Jim Zegeer

[57] ABSTRACT

A bicycle frame suspension comprises a single main tube having fore and aft ends and left and right sides with a head tube for rotatably mounting the front steering forks and front wheel secured to said fore end and a seat retention tube for mounting the seat secured to the aft end and bearings attached to either side of the main tube. A rigid rear triangle assembly has a bottom bracket for rotatably mounting the pedal and crank assembly. Left and right chain stay tubes have forward and trailing ends. A wheel fixing dropout is secured to each trailing end, respectively. The forward ends are secured to the bottom bracket. Left and right seat stay tubes have trailing ends secured in the proximity of the trailing ends of the chain stay tube and the dropouts, respectively. Pivot struts have upper and lower ends with the lower ends being secured to the bottom bracket, the upper ends being provided with bearing fittings and spaced apart a distance D and joined to forward ends of the seat stay tubes. A suspension spring assembly has one end connected to the bottom bracket and the other end connected to said main tube and proximate the aft end of the single main tube.

6 Claims, 5 Drawing Sheets

HIGH EFFICIENCY BICYCLE FRAME SUSPENSION

I. FIELD OF INVENTION

This invention relates to human-powered cycles, specifically to an improved bicycle frame design which isolates the rider from shock.

II. PRIOR ART

| U.S. Pat. Nos. | | |
| --- | --- | --- |
| Owen, H. S. | 392,523 | 1888 |
| Jeffrey, T. B | 398,158 | 1889 |
| Becker, H. A | 439,095 | 1890 |
| Surbridge, R. G. | 450,705 | 1891 |
| Mathews, J. | 463,710 | 1891 |
| McGlinchey, C. E. | 465,599 | 1891 |
| Burton, T. | 470,317 | 1892 |
| Travis, C. | 739,237 | 1903 |
| Shelton, H. A. | 1,016,042 | 1912 |
| Michaelson, J. | 1,047,431 | 1912 |
| White, E. | 1,075,886 | 1913 |
| Riva, D. | 2,756,071 | 1956 |
| Ryan, J. | 3,301,575 | 1967 |
| Lawwill | 4,789,174 | 1988 |
| | Italy | |
| Azioni and Padora Brev. | 446263 | 1949 |

Traditional bicycle designs utilize a rigid tubular frame made up of two triangles to support the rider and distribute his weight to the front and rear wheels. The frame also reacts the pedaling loads; both the torsional moments about the long axis of the bicycle and the compressive force exerted by the chain. The frame must be rigid enough so that pedaling force does not cause notice-able flexing of the frame, or control and efficiency will be compromised. For example, U.S. Pat. No. 4,500,103 to Klein discloses a rigid, double triangle design bicycle frame which is highly efficient in transmitting pedaling forces to the drive wheel with minimal loss of energy to frame deflection. In that patent the concept of energy loss through frame deflection is discussed.

However, the traditional double triangle design is inherently much stiffer in in-plane bending than in torsion or out-of-plane bending. Thus traditional frames readily transmit road shock to the rider. This shock is minimized to some degree by the use of pneumatic tires, handlebars with a small amount of vertical flex and shock absorbing materials at the points on the bicycle where the hands and buttocks rest. When the bicycle is used to travel on smooth, paved roads exclusively, these means of shock isolation are generally sufficient to prevent discomfort. However, when bicycles are used on rough, uneven surfaces, they are not. Various inventors have addressed this problem by modifying the basic bicycle frame design to incorporate suspension. For example, in U.S. Pat. No. 1,016,042 Shelton disclosed a frame design incorporating a pivot slightly above and forward of the pedal crank axle. This pivot allowed the seat and the rear axle to oscillate relative to one another in the plane of the frame. A spring (either pneumatic or coil) was placed in the frame between the seat and the rear axle to absorb shock forces. The coil spring design used three springs acting in parallel, placed side by side. Shelton's design was advanced for its time. It utilized a pivot location which kept the rear triangle intact: the forces exerted by the chain did not pass through the pivot. It also used only one pivot, resulting in few moving parts. However, the system did have some significant drawbacks:

(a) It routed the torsional pedaling forces through a relatively narrow ball-bearing joint and thus reduced the torsional rigidity of the frame.

(b) The location of the pivot was directly in line with water and mud slung off the front wheel, so it was more prone to failure due to corrosion and contamination.

(c) The long distance between the pivot and the spring allowed only a small amount of travel.

(d) The long moment arm between the pivot and the saddle provides a supple saddle attenuation, but very limited crank or foot suspension.

U.S. Pat. No. 2,756,071 to Riva discloses a frame design that is similar to Shelton's in that the rear triangle and bottom bracket are kept together in one rigid assembly. However, Riva placed the pivot in a higher, more protected location and used a compression spring under the saddle. Riva's design is also shown with an internal combustion engine incorporated into the rear frame section. The current invention is an improvement upon Riva's design, with the following changes:

(1) Spring design (elastomeric vs. coil, parallel vs. series, easily disassembled vs. conventional).

(2) Damper incorporated into spring assembly.

(3) Spring location routes loads directly into bottom bracket, rather than into the seat stays, an area of inherently high strength, vs a traditionally very light walls and structure.

(4) Pivot location is a function of rider size and frame size.

(5) Pivot design utilizes wide stance and large diameter, low stress bearings for light weight, maximum strength and rigidity.

(6) Tension/Compression integral down tube spring design places the spring between the bottom bracket and the head tube.

(7) Main tube between head tube and seat is made from an aluminum tube with continuously varying wall thickness and shape, light weight, maximum strength and rigidity.

(8) Rear triangle design uses twin triangle space frame tubular structure to optimize weight, strength and stiffness.

(9) Riva has design interference between seat post adjustment and spring assembly. It will be difficult to achieve both long suspension travel and adequate seat post adjustment at the same time or in the same configuration. The placement of the spring/damper unit in the rear section of the frame inside of the front derailleur tube eliminates the potential interference. Many frame designs have limited suspension travel or suffer some other deficit because of the interference of the typical spring/damper unit with the rest of the structure, components, or the rider.

(10) The Riva design incorporates a rear structure made of formed metal plate. in order for it to have adequate rigidity, it must have a significant wall thickness. This is not a light weight, performance oriented design. It weighs too much. This would not work well for a pedal powered vehicle, but is very acceptable with the addition of engine power.

(11) The invention provides both long travel and by alternating the seat tube and derailleur tube, also provides for adequate seat post adjustment.

(12) The rear shock arrangement provides for a compression/tension shock mounted neatly and cleanly inside of the front derailleur tube, and sealed from the environment with an elastomeric boot.

(13) The Down Tube Shock also provides a modular, sealed from the elements design.

The large increase in off-road bicycling for sport during the decade of 1980 to 1990 resulted in an increased need for an effective bicycle suspension system. Casual off-road cyclists found that the use of shock-absorbing bicycle frames increased their level of comfort. Competitive cyclists found that suspension systems allowed them to travel downhill on rough terrain at higher speeds than was possible with rigid frames. An example of a frame design intended to meet the need of this group of cyclists is disclosed in U.S. Pat. No. 4,789,174 to Lawwill. Lawwill's design utilized a four-bar linkage with a coil spring in the rear triangle in which the pivots were located near the bottom bracket, in the center of the seat tube and at the rear dropout. Although this system allowed for a considerable amount of up and down travel for the rear wheel, it also had the following disadvantages:

(a) It had four times the number of pivots used in Shelton's design, increasing weight, manufacturing complexity, static and dynamic friction, and cost.

(b) The pivots were located in positions subject to mud and water sling.

(c) The spring was located very close to the forward pivots, requiring a stiff (and therefore heavy) coil spring, also highly loading the affected pivots.

(d) The relatively large Chain forces passed through pivots.

Girvin addressed some of these problems with their Proflex design which utilized only one pivot, located about 10 cm directly above the bottom bracket in a position that is somewhat shielded from spray. The spring was placed in line with the seat stay near the joint with the seat tube and top tube. In addition, a microcellular elastomeric foam spring was used rather than a metal coil spring. This improved damping and reduced weight and corrosion. However, chain forces still passed through a pivot, and the pivot was still relatively small in width, constrained by the cranks, pedal and foot clearance.

Roo Designs™ unified rear triangle suspension design isolated the pivot from compressive chain forces, like Shelton. Also like Shelton, only one pivot was used. In this design the pivot was shielded somewhat from debris by its location behind a tensile bladder spring. The rear triangle was kept free of pivots, so that chain forces acted on a rigid structure. However, again like Shelton, the pivot was relatively small and narrow and thus reduced torsional stiffness of the overall frame.

In 1992 John Castellano designed a bicycle frame with a single piece rear triangle and a pivot located about 260 mm above the bottom bracket. A line passing through the center of the pivot and the center of the bottom bracket formed an angle of about 122 degrees from the horizontal. The rear triangle of his bicycle used a twin tetrahedron design to carry loads from the rear axle up to a spring which reacted against the rear end of the forward pivoting frame section. This twin tetrahedron design required numerous tubes, resulting in added weight and complexity in the structure. Italian Patent 446,263 to Azioni and Padora shows a design similar to Castellano's. Because of the long moment arms from the pivot to the saddle, Castellano's design emphasizes isolation of the saddle from shocks. The feet and hands receive relatively little isolation. The ratio of travel between the saddle and the cranks is on the order of 4 to 1.

Other designs from Trek™, Specialized™, Horst Leitner™, Marzocchi™, Ancilotti™, Answer™, Bianchi™, Boulder Bicycles™, Conejo™, Fat Chance™, Diamond Back™, Funk™, Green™, Haro™, Intense™, Marin™, Nishiki™, Scott™, Merlin™, Litespeed™, Monolith™, Mongoose™, Mountain Cycles™, Rocky Mountain™, Stevenson™, Univega™, Ventana™, Yeti™, GT™, Cameron™, M3™, Crosstrac™ and others generally use pivots somewhere in the load path of the chain. Fab Foe's Racing™ uses an oversized, single pivot shaft, but it is located in the path of mud sling and chain loads pass through it. Cannondale™ and Iron Horse™ use a Horst Leitner™ design similar to Proflex™, except that the spring is an air-oil design and the front triangle is replaced by a single constant wall tube.

A design by Kulhawik and Lee is disclosed in U.S. Pat. No. 5,356,165. Their design is an improvement on Italian Patent 446,263. It incorporates two points of adjustment into a bicycle frame suspension system. The forward adjustment point allows the wheelbase of the bicycle to be adjusted and the rear adjustment point allows the stiffness of the spring response to be adjusted. This design utilizes a single piece or unified rear triangle. Kulhawik and Lee's design differs from the current invention in that the movable adjustment points place the pivot in a different, less ideal location than the current invention, and the pivot points are much less stiff laterally and torsionally than those in the current invention. This design is similar to Castellano in that it effectively isolates only the saddle from shock, but even more so.

There is a complex Soviet design which provides for both feet and saddle isolation by using both a front pivot assembly such as Kulhawik for saddle isolation, and also a separate rear wheel isolation to provide foot isolation. This represents a very complex and difficult design. The inherent flex and weight will both be very high compared to the present invention.

In summary, past bicycle frame suspension designs suffer from some or all of the following disadvantages:

1. Multiple pivots and springs are used, with numerous moving parts. This adds complexity and difficulty of manufacture.

2. Torsional and out-of-plane bending flex or movement of the frame is increased due to the use of multiple pivots and/or small, highly stressed pivots. Typical suspension designs are not as torsionally or laterally stable as conventional rigid frame designs.

3. Weight of the suspension frame is relatively high compared to a high performance rigid frame. For reference, a high performance traditional frame without other equipment on it such as a Klein Pulse™ weighs around 3 lbs.

4. Pivots are often located in areas of the frame subject to excessive mud and water sling, resulting in increased contamination, corrosion and excessive wear.

5. Travel of the suspension is limited due to spring and pivot placement relative to each other and the energy absorbing capabilities of the springs & dampers.

6. Chain forces pass through the pivoted linkages of the suspension, causing motion in the suspension due to pedaling and increased wear due to both the additional motion and increased bearing stresses.

7. Pivots are often designed with high unit stress and using unsuitable bearing materials (such as nylon or Delrin), resulting in compression of the bearing material or rapid wear which produces undesirable play in the assembly.

8. Pedalling induced bobbing is very common. Energy is lost due to pedal induced suspension activation. The forces during the power portion of the pedal stroke including the peak chain force and acceleration of the bicycle and rider cause the suspension to move. The cyclist does not have a lot of energy to spare.

9. Some suspensions control pedal induced bobbing by using the chain tension while pedalling to push the suspension against the upper rigid stop. So while pedalling, the suspension acts like a rigid frame. Of course, the suspension is no longer assisting traction or aiding in traversing rough terrain in this case. This is called pedalling induced suspension lockout.

10. Many suspension systems, including pressurized air, metal springs, and elastomers, when not loaded, rest against a fixed or hard stop. It is inherent in the suspension design. Sometimes the overall frame design has not allowed enough room or ease to install a negative or top out spring. This type of suspension is harsh when it is being used. Any release of pressure on a wheel, such as during a jump, or when the wheel rolls into a low spot in the ground, or when the suspension is dynamically rebounding from a compression, results in a clunk against the upward stop. Even though it is not induced by the ground surface, it is still an impact to the rider. When the suspension tops out, it is no longer being effective in keeping the wheel in contact with the ground.

III. OBJECTS, ADVANTAGES AND FEATURES OF THE INVENTION

Accordingly, several objects and advantages of the present invention including the following:

1. To provide a bicycle frame suspension which is simple, with the fewest number of moving parts possible, to simplify manufacture.
2. To provide a bicycle frame suspension which is structurally rigid, minimizing torsional deflection and out-of-plane bending deflection.
3. To provide a bicycle frame suspension which is lightweight (less than 2.4 kg frame weight).
4. To provide a bicycle frame suspension which is durable, with inherent resistance to contamination, corrosion, wear, and the accumulation of play.
5. To provide a bicycle frame suspension which is able to provide at least 10 cm, up to as much as for example 20 cm of travel measured at the rear wheel.
6. To provide a bicycle frame which routes chain forces through a rigid tubular space frame type rear structure, thus isolating the suspension from these oscillatory forces and improving smoothness of the ride and pedalling efficiency.
7. To provide a bicycle frame suspension which minimizes motion in the suspension due to acceleration of the bicycle.
8. To provide a bicycle suspension which minimizes motion in the suspension due to moments generated between the bottom bracket and the pivot point of the suspension, i.e. the action of the feet on the bicycle including the alternating pedalling forces. This improves pedalling efficiency.
9. To provide a suspension system which does not apply force against the rotation of the pedals via the chain when hitting a bump.
10. To provide a bicycle suspension which has a rapid response, i.e. a system with fast-acting springs, in order to maximize the tire contact with the ground and the traction.
11. To provide a bicycle suspension which is supple, i.e. the suspension has very low static friction, in order to achieve superior isolation of small or high frequency bumps, in addition to the larger bumps. This has been very difficult for most frame suspensions. They have been content to provide a degree of isolation only on the big "hits". The static friction inherent in the multiple or large diameter pivots and the sliding surfaces such as the high pressure air/oil seals, sliding bearings, and the increased static friction caused by some of the leveraged forces on these surfaces leaves them unresponsive to the smaller terrain features, which none the less contribute to rider fatigue and loss of traction & control. Devices which would exhibit acceptable static friction on a motorcycle do not on a bicycle because the bicycle does not have sufficient mass to activate them at similar acceleration levels.
12. To provide a suspension system which is fully active in all conditions, including while pedalling.
13. To provide a suspension system which includes a significant negative spring to eliminate top out clunk, reduce shock transmitted to the frame and rider, and improve performance and traction on rebound and in negative travel situations such as holes or dips. Some systems include a small rubber O-ring or comparable to cushion the top out situation. While a very short travel negative spring like this can eliminate the audible noise, most of the harsh acceleration is still present. The top out or negative spring should be engaged for at least 10 percent of the total suspension travel to be most effective.
14. The springs should be preloaded against each other. This achieves control of the spring rate continuously through the full travel of the suspension, provides supple response on small bumps, and allows the suspension to be easily used by different weight riders many of the suspension systems available require changing springs or air pressure to function under different weight riders.

DESCRIPTION OF THE DRAWINGS

Further objects and advantages will become apparent from consideration of the following description and drawings wherein.

DETAILED DESCRIPTION OF THE INVENTION

Figure 1:
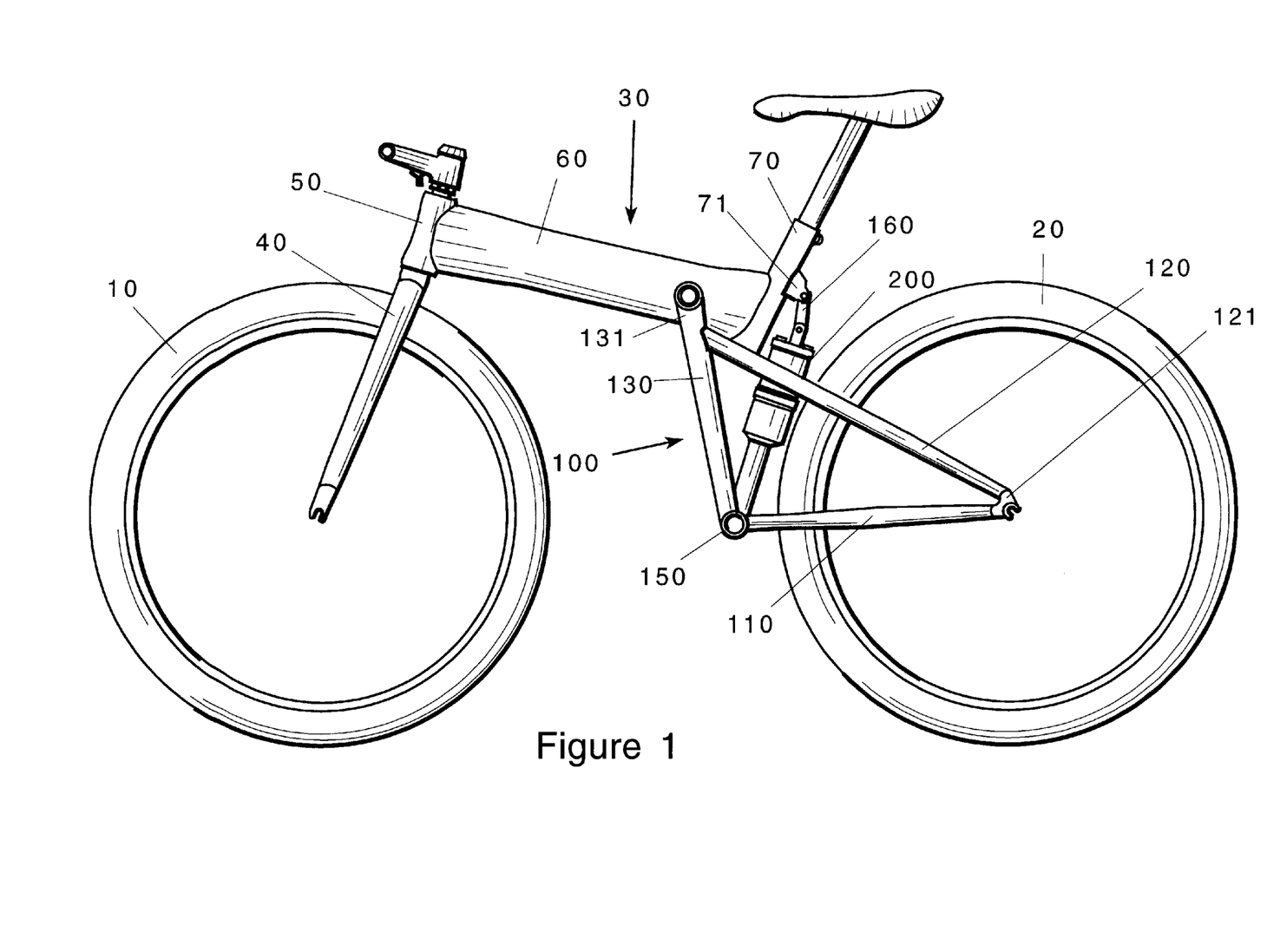
FIG. 1 illustrates a suspension bicycle according to the present invention utilizing a front derailleur tube spring assembly.
Figure 2:
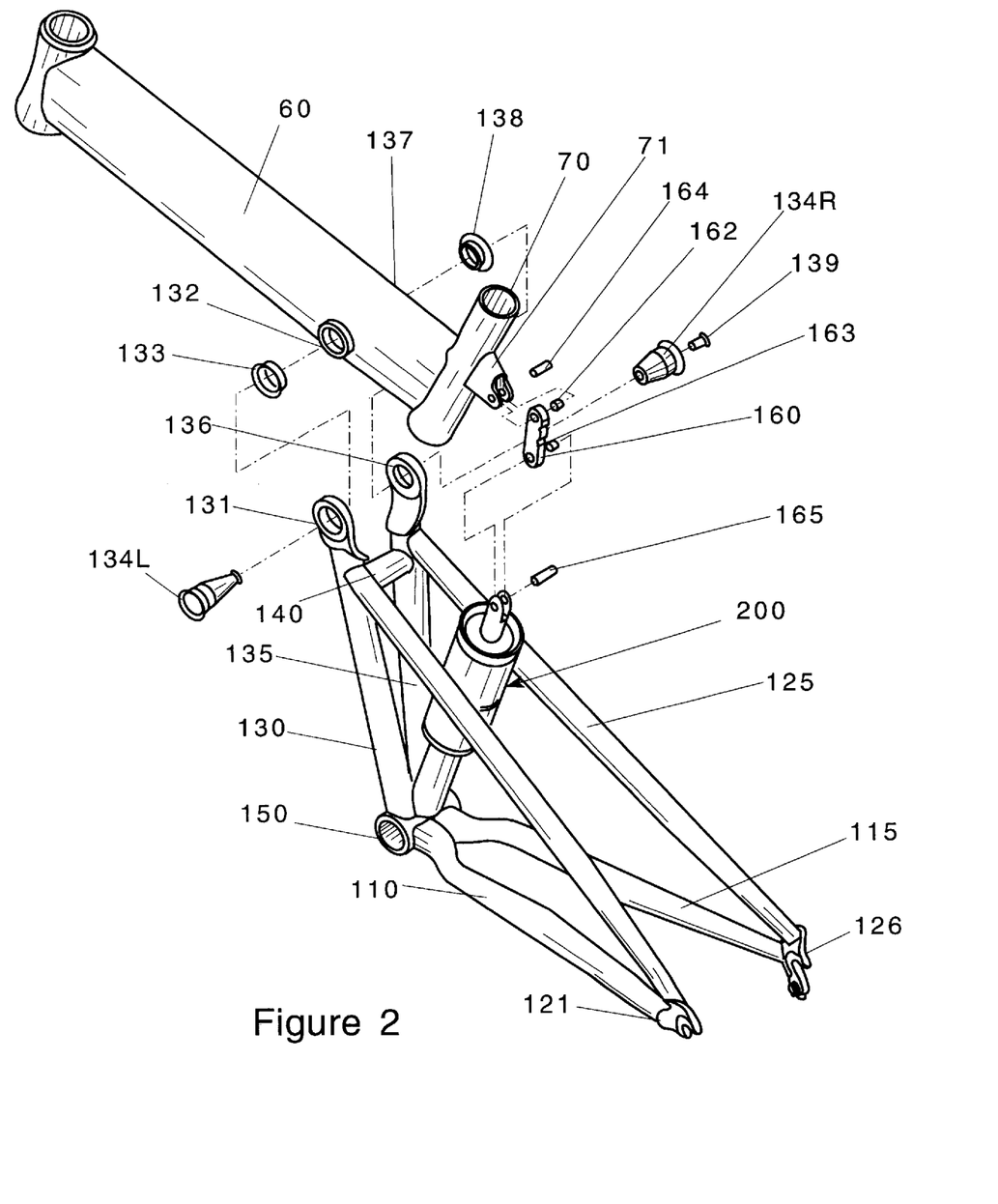
FIG. 2 illustrates the assembly of the pivot and linkage of the present invention.
Figure 3:
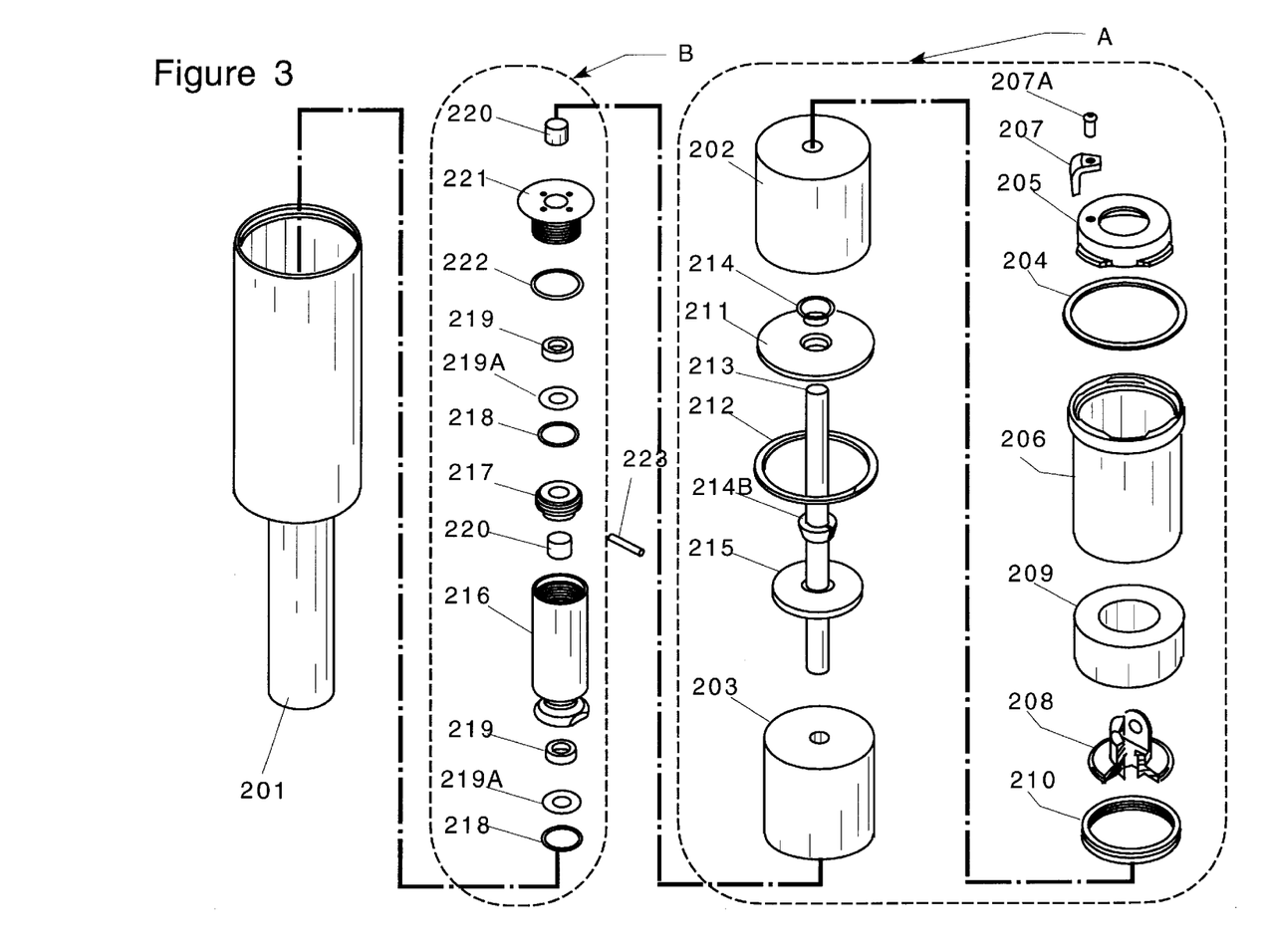
FIGS. 3 and 4 illustrate the internal components of the spring assembly of the present invention.

A typical embodiment of the bicycle frame suspension of the present invention is illustrated in FIGS. 1, 2 and 3. FIG. 1 is a simplified side view to show the overall layout of the design, while FIGS. 2 and 3 show internal details of the pivot and spring mechanisms.

A. FIG. I Overall Layout Referring to FIG. 1, a front wheel 10 and a rear wheel 20 are joined by a frame 30 and a front fork 40. Fork 40 includes a steerer tube which pivots in head tube 50. A main tube 60 connects head tube 50 to a seat retention tube 70. As best seen in FIG. 2, the chain-chain stays are preferably constructed according to that disclosed in U.S. Pat. No. 5,452,911 issued Sep. 22, 1995 entitled "High Efficiency High Clearance Chainstay and Method of Making Same for Bicycles," incorporated herein by reference. A rear triangle assembly 100 is a unitized, rigid assembly comprised of a:

(a) left chain stay 110

(b) right chain stay 115

(c) left seat stay 120 with left rear dropout 121

(d) right seat stay 125 with right rear dropout 126

(e) left pivot struts 130 with a left pivot strut end fitting 131

(f) right pivot strut 135 with a right pivot strut end fitting 136

(g) crossbrace 140

(h) bottom bracket 150

(i) linkage 160

Figure 5:
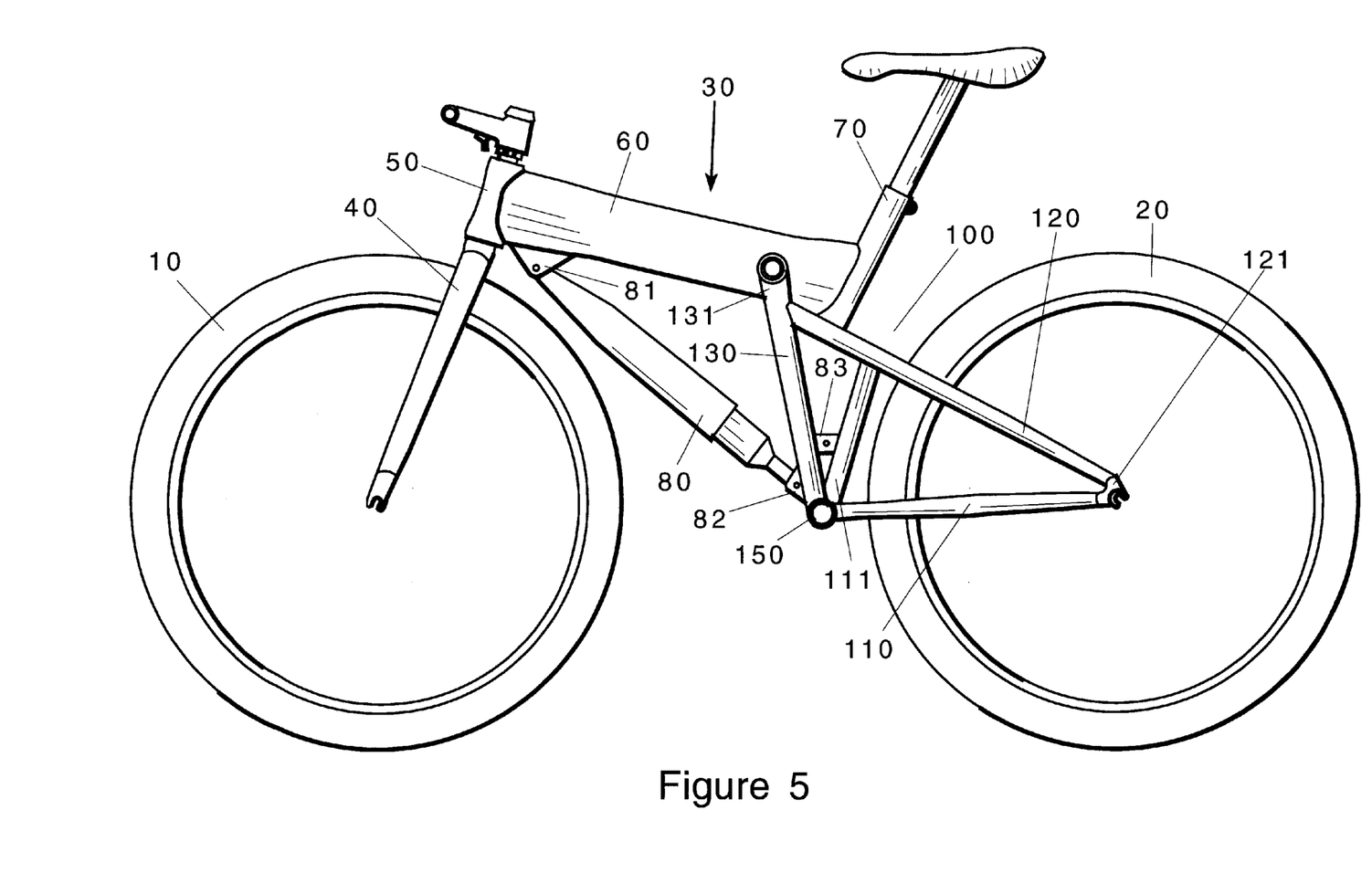
FIG. 5 illustrates a suspension bicycle according to the present invention utilizing a tensile/compressive down tube spring assembly.

(j) front derailleur tube spring assembly 200 Alternately, spring assembly 200 may be replaced by a down tube spring assembly 80 (FIG. 5).

B. FIG. 2 Pivot and Linkage Details

In rear triangle assembly 100, chain stays 110 and 115, front derailleur tube spring assembly 200 and pivot struts 130 and 135 are all joined to bottom bracket 150. Using bottom bracket 150 as center, chainstays 110 and 115 extend radially in a generally horizontal direction to the rear where they are terminated by dropouts 121 and 126. Front derailleur tube spring assembly 200 extends radially from bottom bracket 150 in a generally vertical direction, at an acute angle from chainstays 110 and 115. Pivot strut 130 extends radially from bottom bracket 150 in a generally vertical direction, at an obtuse angle from chainstays 110 and 115. Seat stays 120 and 125 join dropouts 121 and 126 to pivot struts 130 and 135 slightly below pivot strut end fittings 131 and 136. Cross brace 140 connects pivot struts 130 and 135 at two points slightly below the intersections of seat stays 120 and 125 with pivot struts 130 and 135. In other words, tubes 110, 120 and 130 lie generally in one plane which is upright and close to parallel to the plane of frame 30 and tubes 115, 125 and 135 lie generally in another plane which is upright and close to parallel to the plane of frame 30. Cross brace 140 lies in a plane which is perpendicular to the plane of frame 30. This arrangement of tubes produces a rigid yet lightweight and simple assembly. The placement of spring assembly 200 in a direct line between bottom bracket 150 and the rear end of main tube 60 prevents loads from the suspension system from being applied directly to typically light weight seat stays 120 and 121. This reduces load concentration in the rear triangle which allows use of lighter tubing than would be necessary if concentrated loads were present.

Fittings 131 and 136 join rear triangle 100 to main tube 60. Linkage 160 connects seat retention tube 70 via a flange 71 to spring assembly 200. Thus, frame 30 is made of two discrete units which pivot in one location. Motion about the pivot is controlled by spring assembly 200 to absorb shock. Chain forces are isolated to the rigid rear triangle 100 and out-of-plane bending forces and torsional moments are passed through the large, widely-spaced pivot strut end fittings 131 and 136.

The saddle and the feet do not necessarily see the same degree of isolation on this type of design. The forces are in different directions, as well. The rider is sitting back on the saddle. He or she is leaning backwards and down on the saddle and pushing down and forwards with the arms and hands. When the rear wheel hits a bump or lands, it is very natural for the saddle to isolate the riders weight by moving down and toward the rear, as it does in this design. If the saddle were attached to the rear portion of the frame, as in the Slingshot design, It would be moving forward, against the natural path the rider's buttocks would prefer to take. The best isolation of the feet is by a substantially vertical motion. In the invention, the BB moves substantially downward relative to the other contact points of the rider and the riders mass. As the suspension travels, the front wheel moves forward and the rear wheel moves rearward. As the bike is much lighter than the rider, the riders mass is the main dynamic locating or reference point for the travels. The best way to measure the travel directions is to assume that in any design where the distance between the wheels changes as the suspension works, that the front wheel moves forward the same amount as the rear wheel moves backwards. The location of the pivot determines both the direction of suspension motion on each contact point, and the relative sensitivity of each.

The distance from the front wheel axle to the pivot is roughly the sensitivity of the BB. The distance from the front wheel axle to the saddle is roughly the sensitivity of the Saddle. The ratio of the two moments gives an approximation of the effective isolation between them.

The more accurate method is to measure the actual travel of the saddle under full deflection, and the actual travel of the BB under full deflection, relative to the rider's Center of Gravity. This is approximated by using the same distance of horizontal travel for the front and rear wheels. This takes into account all of the geometry variables. As the suspension spring will store the same amount of energy for full deflection of the system in each case, and energy is the area under the force x deflection curve, the effective suspension spring constant ratio of saddle to BB will be the square of the respective travel ratio.

For the present invention, a travel ratio of about 1.4 saddle to BB travel is good for cross country use, providing reasonable and useful suspension action for both the feet and saddle. This represents a spring constant ratio of about 2:1 between the saddle and BB. The spring constant at the BB is approximately 2 times higher than the spring constant at the saddle. The saddle is effectively softer so that the rider may apply power sitting, and obtain a very supple seated suspension response, with very good traction and adhesion of the front and rear wheels. The rider will be able to speed along a rocky or rough surface with minimal impact on the riders mass, and minimal loss of forward momentum due to vertical impacts. When the rider stands up, as in a difficult or technical section, or going down a steep hill, or going over an obstacle, or making a jump, the suspension becomes stiffer and the frame and Bottom Bracket rise a small amount, which helps the rider's control of the bike, and clearance over obstacles. For example, in order to jump the bike over an obstacle, the rider needs to spring upwards with the bike. If the suspension is overly soft and highly damped when he or she attempts this, the riders force is absorbed by the suspension and the rider's timing is adversely impacted, and the height and distance achieved are markedly reduced. This corresponds to the best overall compromise of a multi use or cross country type of suspension bicycle.

For high speed downhill use only, a downhill specific bicycle utilizing a lower travel ratio is desired, but not less than unity. The spring constants will become much more similar, as well. As the pivot is moved toward the rear, the travel ratio decreases. Also, as the pivot is raised higher from the ground, the ratio decreases, but not as strongly as moving it towards the rear. So a downhill bike may benefit from a higher or more rearward (or both) placed pivot.

The pivot is more difficult to implement if it is located within the diameter of the tire, and the ratio of saddle to BB travel can become close to or less than unity as the pivot is moved this far to the rear. Therefore it is not envisioned that the pivot be located within the diameter of the tire. It may be located a little above the center of the wheel, and close to the tire for a downhill type bike where maximum suspension travel is desired both sitting and standing. The high speed downhill bike will optimally have its pivot in the region between the saddle and the bottom bracket, or a little to the rear of this line.

To achieve a position where the suspension is not activated by pedal forces, other than certain out of phase vertical dynamic loading due to the rider, the pivot needs to be in a balance point where the coasting forces as are present in the spring when the riders legs are at rest or at top dead center of the pedal stroke, are similar to the dynamic forces in the spring when the rider is applying additional force to the forward pedal and accelerating the bicycle. The optimum is to balance these forces for the conditions where the rider is sitting and pedalling, as well as standing and pedalling. It is not objectionable for the spring forces to change as the rider lifts up out of the saddle. This energy consumed by the suspension is minimal compared to the energy loss from pedalling induced bobbing so prevalent in many other suspension designs. The rider does not change from sitting to standing nearly as frequently as the pedalling rotation. Lifting as the rider stands will be inherent as the spring constant is greater for the BB than the saddle. As the rider reduces the saddle force and instead supports it by the BB, the bike will lift to some degree. This can be advantageous, especially since the rider typically stands in order to traverse a technical section or obstacles. A small amount of additional BB height for obstacle clearance becomes a plus in these conditions. For general trail riding, it is desired to keep the center of mass of the bicycle and rider as low as possible without encountering ground clearance problems.

The balance between coasting (static) and pedaling (accelerating) involves the relative positioning of the pivot in relation to the combined CG of the rider and bicycle, and the rear axle of the bike. For a medium size rider of 1.74 m, the CG will be about 914 mm above the ground or 584 mm above the rear axle (for a typical 26 inch diameter rear wheel) and about 457 mm in front of the rear axle. The acceleration force at the rear wheel trying to lift the bike is balanced by the acceleration forces on the rider (mainly) above the pivot tending to compress the suspension.

For the medium rider, this balance point will be between 30–36 degrees and preferably at about a 33 degree angle from the horizontal forward and upward from the rear wheel axle for a 26inch diameter rear wheel. On a larger rider, the combined CG is higher, and the balance angle will be larger also, up to about a 36degree angle. The smaller adult rider will balance at an angle of around 30 degrees.

Changing the wheel size has a small effect on the balance angle, about −0.4 degrees change for each inch of wheel diameter change. For example, a frame incorporating a typical 27 inch diameter rear wheel with a medium rider would pivot along a line 32.6 degrees from the rear axle, and a frame incorporating a 20-inch diameter rear wheel and the same rider would pivot along a line 35.4 degrees from the rear axle.

The angles and dimensions given above are for a typical high performance racing geometry bicycle, which is the main thrust of this invention. Longer wheelbase frames would use a lower angle for the balance line, perhaps as much as 2 degrees lower for a full touring type of bicycle, which would also benefit greatly from the invention.

So the balance angle could range from a low of 27.6 degrees for a 27 inch diameter wheel touring bike with a small rider, to a high of 38.4 degrees for a racing bike using a 20 inch diameter rear wheel for a large rider. Most uses will be within 3 degrees plus or minus of the 33 degree value, however.

The intersection of the balanced pedalling force condition and the desirable ratio of the feet to saddle spring constants results in a high pivot location ranging just forward of the bottom bracket, providing about 1.5 times the travel of the seat compared to that of the bottom bracket, at an upward and forward angle from the rear wheel axle of between about 27.6 degrees and 38.4 degrees, to a practical pivot position just forward of the rear tire, where the saddle travel and spring rate is about equal to the BB travel and spring rate, between the same angles.

Out of phase dynamic force. This refers to the force the cyclist applies to the pedals that does not directly contribute to forward propulsion of the bicycle. When a skilled rider is pedalling from the sitting position, there is little out of phase force. The rider applies the maximum downward pedalling force when the crank is perpendicular to the force. When a typical rider pedals while standing up, however, there is a tendency to have some of the cyclists weight or force downward on the pedal just completing its stroke. As this force predominately is not tangential to the rotating path of the pedal, very little of it goes into forward propulsion. The cyclist tends to lift his or her weight upwards at the end of each pedal stroke, much like climbing a stairs, in order to start the next pedal stroke. Deflection of the frame (suspension or not) and movement of the suspension due to the dynamic nature of the force, result in the cyclist wasting energy. As this dynamic force is not reflected in acceleration of the bicycle, and is similar in nature to the cyclist hitting a bump or landing from a jump, there does not appear to be a direct mechanical static force method of balancing the suspension to eliminate it. To do so would reduce the suspension effectiveness on bumps. In order to balance an out of phase dynamic component it would require temporary storage of energy and timing of force to offset it such as a rotating counter balance shaft as used in automotive engines. Due to the desire to maintain a lightweight and simple structure on the high performance competition bicycle, it is not feasible to incorporate additional equipment like this. Cyclists can train themselves to greatly reduce this out of phase type of component. They work to develop a smooth pedaling style, with an even application of force to the pedals, attempting to apply torque to the cranks over a large angle of the stroke. They also train themselves to pedal without moving other parts of their bodies not necessary for pedalling, and without moving their body mass up and down with each pedal stroke.

The location of the pivot is important for the following reasons:
1. It affects the performance of the suspension by determining the leverage on the spring assembly.
2. It affects the response of the suspension system to the input of pedaling loads. If the pivot is placed high above the bottom bracket and nearly above the bottom bracket, as discussed above, very little bobbing of the bicycle occurs due to pedaling action. If the pivot is placed close to the bottom bracket or some other position, the pedaling action of the bicycle may produce bobbing.

3. The pivot should be located in an area where its 100 mm stance will not interfere with the action of the rider's legs.
4. The corrosion and contamination resistance of the pivot is influenced by its location relative to the mud sling path from the front & rear tires.
5. Optimum pivot location is dependent upon rider size. Large riders require a higher seat location and a correspondingly higher pivot location. The higher pivot location more effectively balances the higher pedaling loads and higher center of mass generated by a larger rider. For small riders the converse is true.

Fittings 131 and 136 are rotatably secured to main tube 60 at a left pivot boss 132 and a right pivot boss 137, which are fixedly attached to main tube 60. A left self-lubricating pivot bushing 133 fits between fitting 131 and pivot boss 132. A right self-lubricating pivot bushing 138 fits between pivot strut end fitting 136 and pivot boss 137. Left and right pivot binder caps 134L and 134R fit concentrically through pivot strut end fittings 131 and 136 when assembled with pivot bushings 133 and 138 and pivot bosses 132 and 137. A threaded fastener 139 secures caps 134L and 134R together in the center of the pivot assembly, which is contained in main tube 60. The large diameter of bushings 133 and 138 (approximately 31 mm) reduces bearing stress on the pivot, the large distance D) (between 80 and 100 mm) between bosses 132 and 137 react bending moments with reduced stress on the pivot and the self-lubricating surface of bushings 133 and 138 help counteract the effects of corrosion and contamination. In addition, the pivot is located high on the frame, in a location that is sheltered from mud and water sling. Spring assembly 200 is attached at its upper end to the lower end of linkage 160. The upper end of linkage 160 is attached to flange 71. Linkage 160 is comprised of:

(a) link arm 161
(b) upper and lower self lubricating bushings 162 and 163
(c) upper and lower pins 164 and 165.

Bushings 162 and 163 fit into holes in the upper and lower ends of linkage 160. Pin 164 passes through a hole in the right side of flange 71, then through bushing 162 (which is contained in the upper hole of linkage 161), then through the left side of flange 71 to form a rotatable joint. Pin 165 passes through the right side of the upper end of spring assembly 200, then through bushing 163 (which is contained in the lower hole of linkage 161), then through the left side of the upper end of spring assembly 200 to form a rotatable joint.

When spring assembly 200 is replaced by down tube spring assembly 80, a front fitting 81 and a rear fitting for firm response 82 and a rear fitting for soft response 83 are joined to main tube 60 and pivot struts 130 and 135. Flange 71 and linkage 160 are also eliminated when spring assembly 80 is utilized, and a seat tube III is joined to bottom bracket 150 and the center of seat stay 120. A suspension system utilizing spring assembly 80 allows more travel for rear wheel 20 when an impact occurs than does a suspension system utilizing spring assembly 200. This increased travel is needed for riders competing on high speed downhill courses. Two fitting locations 82 and 83 allow the suspension system to be adjusted. Fitting 82 is utilized when a firm response is desired from the system, as when a winding course with much maneuvering is expected. Fitting 83 is utilized when a softer response is desired, as when a bumpy and rutted course is expected. In addition, the geometry of the bicycle suspension using spring assembly 80 is such that the distance between the axis of spring assembly 80 and pivots 132 and 137 decreases as wheel 20 rises due to impact. The decrease in distance results in a reduction in the moment applied by spring assembly 80 about pivots 132 and 137. This decrease in moment (for a constant spring rate in spring 80) results in a slight decrease in firmness of the suspension as it is compressed in an impact. Since the spring rate of spring 80 is not constant, but slightly increases with degree of compression, the two effects help to cancel each other out to result in a more nearly constant delta load/delta deflection ratio. This means that the suspension action of the frame is smooth and even throughout its stroke.

In the preferred embodiment, head tube 50, main tube 60, seat retention tube 70, and rear triangle assembly 100 are aluminum, but other materials such as, but not limited to steel, titanium, metal matrix composites or polymeric matrix composites could also be used. In the preferred embodiment, tungsten-inert-gas welding is used to form all joints, but other techniques, such as but not limited to adhesive bonding or brazing could also be used.

Figure 4:
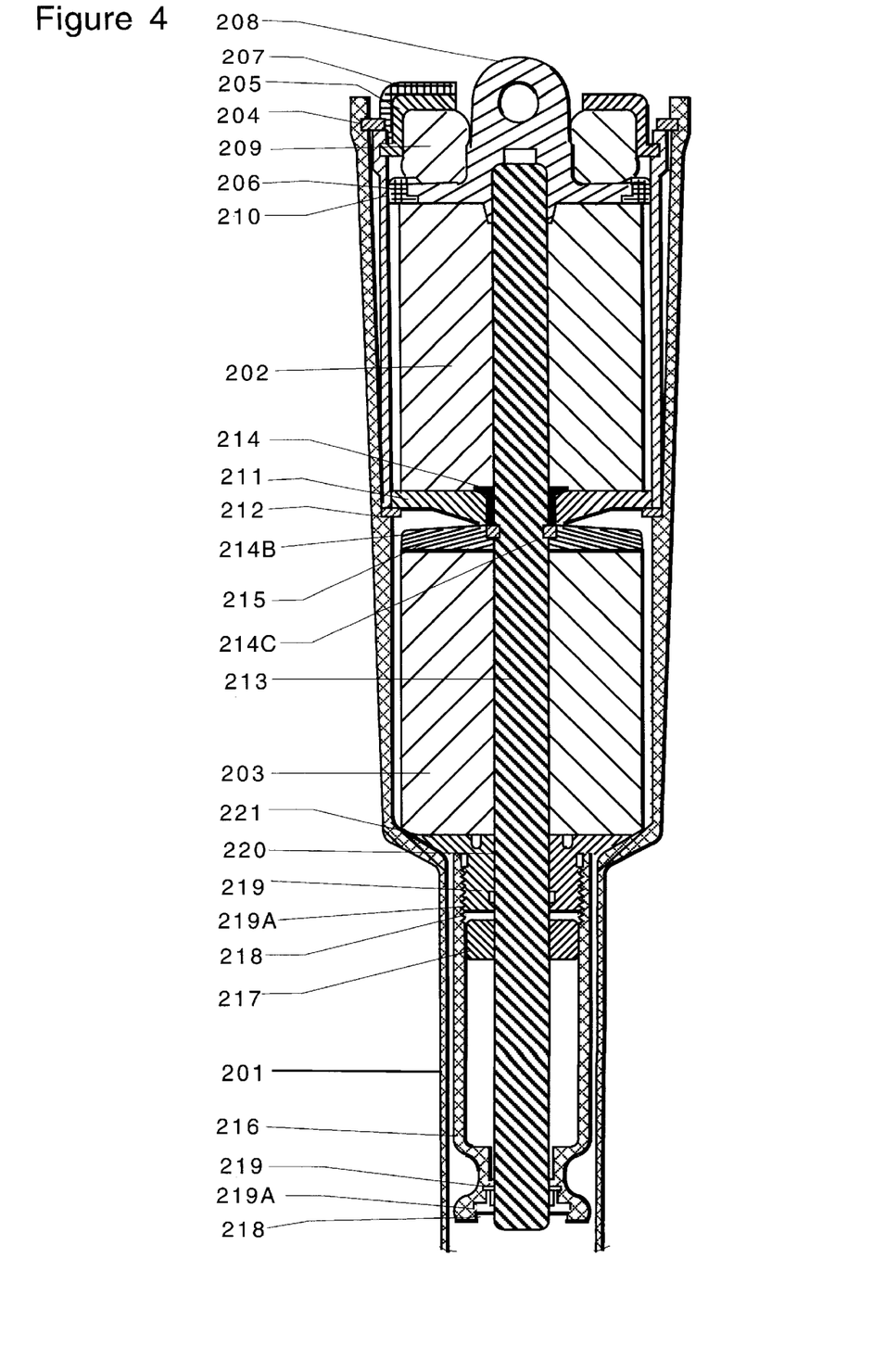

Spring assembly 200 is made up of two main subassemblies consisting of a spring mechanism A and dashpot mechanism B (see FIGS. 3 and 4). Mechanism A contains an elastomeric spring 202 and an elastomeric spring 203 connected in parallel inside a housing tube 201. This effectively doubles the cross-sectional area of the spring and thus doubles the spring rate without increasing the outside diameter of housing tube 201. For example, a double spring with an outside diameter of 55 mm will have an equal spring rate to a single spring with an outside diameter of 78 mm. Minimizing the diameter of tube 201 provides increased clearance for rear wheel 20 and seat stays 120 and 125. The details of spring assembly 80 are identical to those of spring assembly 200, except for differences in size that do not affect the function of the spring.

The top of spring mechanism A is contained by a retaining ring 204, a quick release cap 205, and a wear sleeve 206. These three components restrict the upward motion of a plunger 208 and apply static compressive force to the system. This compressive force is referred to as preload. Preload prevents the suspension system from sinking an undue amount under the bicycle rider's body weight when only the force of gravity is acting upon the rider's body e.g. it prevents up and down travel of the suspension except when downward force on plunger 208 exceeds the preload force, such as when the bicycle passes over a rough surface. A bumper 209 softens impact of plunger 208 against cap 205. Cap 205 is designed with flats to engage the lips of sleeve 206 during installation with an easy, ¼ twist. Cap 205 is then secured in place with a wedge 207 and a screw 207A.

A liner 210 acts as a bearing surface between plunger 208 and wear sleeve 206. Wear sleeve 206 is easily replaceable in the event plunger 208 wears against it. This design feature prevents damage to housing 201, which is not easily replaced.

When a downward force is exerted on the seat of the suspension bicycle of this invention, a compressive force is exerted through plunger 208 on springs 202 and 203. This compressive force is reacted by housing tube 201, which is joined to rear triangle assembly 100. Rear triangle assembly 100 passes the load to the ground through dropouts 121 and 126 and rear wheel 20.

The compressive force exerted on spring 202 is reacted by a stopper 211 and a retaining ring 212. Compressive force also passes from plunger 208 through a shaft 213, a ring 214B and a compressor disc 215 into spring 203. A ring 214B retains sleeve 214A onto an annular groove 214C in shaft 213. Spring 203 reacts this compressive force against housing tube 201 through a damper cylinder 216. Thus, plunger 208, shaft 213, sleeve 214A, ring 214B and disc 215 move up and down inside housing tube 201 in response to loads exerted during riding.

Damper mechanism B is made up of a moving valve body 217 secured to the lower end of shaft 213 inside cylinder 216. Compressible Hydraulic fluid such as silicon based oil fills cylinder 216 and damping force results from the pumping energy loss caused by moving fluid through the space between valve body 217 and the wall of cylinder 216. Valve body 217 is retained on shaft 213 by a lock pin 223. The inside diameter of cylinder 216 is slightly tapered so that the clearance between valve body 217 and the cylinder wall varies throughout the stroke. Radial clearance is approximately 0.10 mm at the top and bottom of the stroke and approximately 0.25 mm at the middle of the stroke.

The annular fluid passageway with smoothed and gently tapered entrance and exit is referred to as a Delaval nozzle. The damping force in a typical sharp edge hole orifice type damper goes up as the second or larger power of the fluid velocity. So that under a high shock load the damping forces quickly become excessive, virtually locking up. Most orifice type shocks also include various means of pressure relief valves because of this. The damping force of the Delaval with suitable compressible fluid is more nearly linear to velocity and can be as low as the 0.7 power of velocity. The velocity of the damper is generally small at the resting position and at the maximum stroke position. The velocity will be at its maximum in the middle region of the damper stroke. The suspension has to be accelerated away from the rest position, and decelerated on returning to the rest position. It also needs to be decelerating to a stop at the maximum stroke position. For a given impact load, the most desirable type of damping is an approximately even distribution of the damping force during the compression and rebound. In order to attain this ideal, and avoid a high peak damping force, the cross section of the nozzle is varied over the length of the stroke to provide a uniform damping force during the acceleration, maximum velocity, and deceleration phases of the stroke in both directions. This, in turn, reduces ride harshness and improves damping response and suspension control.

An over damped condition reduces tire traction and directional control. Excessive rebound damping can keep the tire from contact with the ground. Excessive spikes in compressive damping on a large, fast bump will jolt the rider, similar to not having the suspension at all. Alternatively, an under damped system can oscillate out of control. The ideal is the minimum amount of damping needed in order to control undesirable oscillations of the overall system. Some dampers function mainly on the rebound, as the rebound forces are limited by the suspension spring force. This reduces the peak loading on an orifice type damper, but can keep the tire from contact with the ground for an extended period of time. It is better to provide some significant degree of damping in both directions, and not to damp mainly on the rebound stroke. The preferred configuration provides equal or better damping on the compression stroke, but with damping force proportional to the bump intensity, and applied fairly uniformly throughout the stroke, due to the Delaval force—velocity relationship and the appropriately designed varying annulus cross sectional area.

Shaft 213 enters damper cylinder 216 through a passage in cap 221. Ball seals 219 in combination with washers 219A and a retention rings 218 seal the upper and lower shaft-to-cylinder joints to prevent loss of hydraulic fluid. Sleeves 220 reduce friction between shaft 213 and cap 221 and cylinder 216. Shaft 213 is thus supported on both ends of cylinder 216. This eliminates side load on valve body 217. Fluid volume inside cylinder 216 is also kept constant with this pass-through shaft design. This is in contrast to a design using a shaft entering from one side only, which shows a reduction in fluid volume as the shaft enters the cylinder.

FRAME STIFFNESS:

The following describe some simple tests to measure some important frame parameters.

TESTING PROCEDURES

FRAME TORSION RIGIDITY:

The head tube of the frame is located on a rigid horizontal surface, with a rigid shaft placed through the normal type head set bearings and tightened up to the bearings in such a way to eliminate all play or looseness in the joint and the bearings.

The shaft is fixed at either end of the head tube to the horizontal surface. The clamping means to the horizontal surface needs to be very rigid as compared to the bicycle frames being tested, so as not to contribute significant additional deflection in the measurements.

The bicycle frame is then free to rotate about the horizontal head tube axis on the normal head tube bearings.

A torque beam is fixed into the rear dropouts of the frame. It extends in two directions from the dropouts, parallel to the head tube. A freely pivoting support such as a ball bearing is used under the lower dropout to maintain the horizontal condition of the frame.

Torque is applied perpendicular to the head tube axis, and angular deflection is measured from the torque beam. Deflection due to the fixtures and torque beam is subtracted from the total deflection to get the actual frame deflection.

In order to measure the play or looseness which may be inherent in a suspension design frame, the torsion rigidity is measured through the zero or unloaded condition. Torque is applied to one end of the torque beam, deflection is measured, then the torque is reduced as measurements are taken. The deflection measurements are continued as the torque is reduced to zero, and then as torque is applied to the other side of the torque beam.

The torsion rigidity is expected to be a generally linear spring constant for most types of bicycle frames. With the exception of the region near zero torque, the applied torque—deflection points generally lie in a straight line for modest levels of torque in one direction. The clockwise torque deflection line will not necessarily be in line with the counterclockwise torque deflection line. The amount of offset of the linear curves occurring through the zero torque point would be the play or looseness in the frame design. This is insignificant in a one piece or traditional frame design, but can be significant in a suspension type frame, especially after some period of use and wear.

The Bottom Bracket and seat tube are unrestrained in the test, in order to obtain an accurate overall frame torque stiffness.

LATERAL FRAME RIGIDITY:

The head tube of the frame is located on a rigid horizontal surface, with a relatively rigid shaft placed through the normal type head set bearings and tightened up to the bearings in such a way to eliminate all play or looseness in the joint and the bearings.

The shaft is fixed at either end of the head tube to the horizontal surface. The clamping means to the horizontal surface needs to be very rigid as compared to the bicycle frames being tested, so as not to contribute significant additional deflection in the measurements.

The bicycle frame is then free to rotate about the horizontal head tube axis on the normal head tube bearings.

The Bottom Bracket spindle is supported on a pivoting type of support to achieve a horizontal frame position. The spindle must also be restrained from motion in the upward direction either by a suitable mass, magnetic, spring, or other method of applying adequate force without restricting the rocking action of the Bottom Bracket Spindle. For the current tests, a ⅝ inch ball bearing was placed over a strong Neodymium Iron magnet and the typical steel BB spindle was placed on top of the ball bearing. The magnetic attraction was sufficient to retain the frame in position with a 10 pound upward load. Loading was accomplished with strings, calibrated weights and a ball bearing pulley in order to apply upward load. A clamp or other type of fixture would restrain the Bottom Bracket spindle from rocking out of perpendicular to the plane of the bike frame and result in a higher overall stiffness and inaccurate test result.

The seat tube is unrestrained in this test, corresponding to the rider standing out of the saddle, applying relatively large lateral forces as in climbing or maneuvering a technical corner.

A typical and appropriate rear bicycle hub is inserted and clamped into the rear dropouts. Downward force is applied to the rear axle, producing a lateral bending moment on the bicycle frame and deflection is measured at the rear axle position as the force is reduced. The force is reduced to zero, and deflection continues to be measured as force is applied in an upward direction.

The down force at the Bottom Bracket Spindle must be sufficient to prevent the spindle from lifting off the pivoting support as load is applied upward at the dropout.

In order to measure the play or looseness which may be inherent in a suspension design frame, the lateral rigidity is measured through the zero or unloaded condition.

The lateral rigidity is expected to be a generally linear spring constant for most types of bicycle frames. With the exception of the region near zero bending force, the applied bending force—deflection points generally lie in a straight line for modest levels of bending force in one direction. The downward force deflection line will not necessarily be in line with the upward force deflection line. The amount of offset of the linear curves occurring through the zero bending force point would be the play or looseness in the frame design. This is insignificant in a one piece or traditional frame design, but can be significant in a suspension type frame, especially after some period of use and wear.

BOTTOM BRACKET TORSION TEST:

The head tube of the frame is located on a rigid horizontal surface, with a rigid shaft placed through the normal type head set bearings and tightened up to the bearings in such a way to eliminate all play or looseness in the joint and the bearings.

The shaft is fixed at either end of the head tube to the horizontal surface. The clamping means to the horizontal surface needs to be very rigid as compared to the bicycle frames being tested, so as not to contribute significant additional deflection in the measurements.

The bicycle frame is then free to rotate about the horizontal head tube axis on the normal head tube bearings.

A torque beam is attached to either end of the Bottom Bracket Spindle. It extends in a direction opposite to the seat tube from the Bottom Bracket, parallel to the head tube. A freely pivoting support such as a ball bearing is used under the Bottom Bracket Spindle to maintain the horizontal condition of the frame. The spindle must also be restrained from motion in the upward direction either by a suitable mass, magnetic, spring, or other method of applying adequate force without restricting the rocking action of the Bottom Bracket Spindle. For the current tests, a ⅝ inch ball bearing was placed over a strong Neodymium Iron magnet and the typical steel BB spindle was placed on top of the ball bearing. The magnetic attraction was sufficient to retain the frame in position with a 10 pound upward load. Loading was accomplished with strings, calibrated weights and a ball bearing pulley in order to apply upward load. A clamp or other type of fixture would restrain the Bottom Bracket spindle from rocking out of perpendicular to the plane of the bike frame and result in a higher overall stiffness and inaccurate test result.

The seat tube is unrestrained in this test, corresponding to the rider standing out of the saddle, applying relatively large lateral forces as in climbing or maneuvering a technical corner.

Torque is applied perpendicular to the head tube axis, and angular deflection is measured from the torque beam. Deflection due to the fixtures and torque beam is subtracted from the total deflection to get the actual frame deflection.

In order to measure the play or looseness which may be inherent in a suspension design frame, the torsion rigidity is measured through the zero or unloaded condition. Torque is applied to one end of the torque beam, deflection is measured, then the torque is reduced as measurements are taken. The deflection measurements are continued as the torque is reduced to zero, and then as torque is applied in the other direction to the torque beam.

The Bottom Bracket torsion rigidity is expected to be a generally linear spring constant for most types of bicycle frames. With the exception of the region near zero torque, the applied torque—deflection points generally lie in a straight line for modest levels of torque in one direction. The clockwise torque deflection line will not necessarily be in line with the counterclockwise torque deflection line. The amount of offset of the linear curves occurring through the zero torque point would be the play or looseness in the frame design. This is insignificant in a one piece or traditional frame design, but can be significant in a suspension type frame, especially after some period of use and wear.

TESTING SUMMARY:

These specific procedures are meant to be illustrative of suitable testing methods. They are achieved with inexpensive tooling, using calibrated weights to apply force and torque and a common precision dial indicator to measure deflection. Any method which applies the forces and constraints in equivalent fashion should be possible to use to determine the same frame spring constants and looseness or play.

Sample frames representing some of the best prior art were tested using the methods described above:

| Weight with Stock stripped of other parts | Klein Mantra ™ Invention | Cannondale ™ Delta V | Specialized ™ FSR | Improvement |
|---|---|---|---|---|
| Pounds | 4.4 | 6.75 | 6.6 | 67% of the mass |
| BB Torsion ft – lbs/ degree | 136.4 | 93.4 | 57.3 | 46% improved BB Torsion |
| Frame Torsion ft – lbs/ degree | 65.1 | 32.8 | 47.6 | 37% improved Frame Torsion |

-continued

| Weight with Stock stripped of other parts | Klein Mantra ™ Invention | Cannondale ™ Delta V | Specialized ™ FSR | Improvement |
|---|---|---|---|---|
| Frame Bending lbs/inch | 116.3 | 84.7 | 92.8 | 25% improved Frame Bending |
| Suspension travel at rear wheel inches | 5.9 | 2.4 | 2.1 | 145% increased travel |

The above frames exhibited much better overall frame stiffness properties than a Castellano type of suspension frame made by I bis™.

The testing shows that the invention is 33% lighter than prior art "long" travel suspension frames, and at the same time exhibits improved frame rigidity, of 25 to 50%, in the most function critical areas. It also provides significantly more useful travel. There are other truly long travel suspension designs around, but they suffer tremendously from excessive weight and flexibility problems. The overall structure of the invention is also predicted to sustain higher loads without failure than other high performance, prior art designs.

The BB Torsion rigidity of the invention will be in the range of 110 Ft-lbs per Degree and higher. The Full Frame Torsion rigidity will be 60 Ft-lbs per degree and higher. The Frame bending Rigidity will be in the range of 110 Lbs per inch of deflection at the rear dropout and higher. Yet the weight of the suspension frame with the spring and damper assembly will weight less than 5.3 lbs for the "down tube" location type spring assembly, and less than 4.6 lbs for the "derailleur tube" location spring assembly for a top quality frame. The "down tube" type of spring assembly allows more freedom in the pivot placement, helps to reduce some of the frame stresses, and allows more travel conveniently. In addition to the additional structural advantages and reduced weight, the invention incorporates and allows for additional suspension travel over many prior art designs.

Less expensive versions of the invention are anticipated to weight about 5.6 pounds for the "down tube" type and 5.2 lbs for the "derailleur tube" type models discussed above. These would be achieved with slightly heavier tubing, and would still exhibit the high rigidity, high strength and efficient handling and suspension properties, but at less cost.

Some of the properties obtained by the invention are very unobvious. Looking at the structure, it was felt that it would be very difficult to obtain an adequate degree of BB torsion rigidity, especially in comparison to the type of suspension frames which have a one piece front frame structure, such as the Cannondale Delta V and the Specialized FSR, with both the down tube and the seat tubes (through the top tube) connecting directly to and reinforcing the BB shell and head tube from torsion. The invention, on the other hand, has only a single main tube, and the head tube and BB shell are not connected by a single piece structure, but through a light weight pivot assembly. The structural load path is also not in a straight line, but bends at the pivot. Further, the other suspension frames were constructed more massively, with heavier walls and overall weight.

Bicycle suspension frames incorporating the invention are considerably lighter and yet achieves higher properties and increased travel than prior art suspension frames. It is not the material, as it uses the same type of material as the Cannondale suspension frame, aluminum alloy, welded and heat treated. It is the combination of lightweight, widely spaced high efficiency pivot design, variable wall thickness, specially shaped main tube, with a light weight, space frame type rear tubular structure and high efficiency spring assembly. The specific pivot location and lightweight, high performance spring/damper assembly also helps achieve the high properties and yet maintain the extremely light weight.

D. Conclusion of Description

Thus, in the preferred embodiment, front derailleur tube spring assembly 200 or down tube spring assembly 80 provide both a spring and a dashpot to react and dampen accelerations resulting from motion of the bicycle and rider over harsh road surfaces. An alternative embodiment which omits dashpot mechanism B is also feasible. This embodiment would be less expensive to produce and would only provide a spring. The only damping action in this design would be that which is inherent to the elastomeric spring material used for springs 202 and 203 and the relatively small amount of sliding and rotating friction due to the bearings and pistons.

The materials used in the preferred embodiment produce a lightweight (under 2.4 kg) bicycle frame including the spring and damper assemblies, incorporating suspension with excellent torsional and out-of-plane bending stiffness. This allows a competitive bicycle rider to maintain optimum control and transmit maximum pedaling power to the rear tire while enjoying the comfort and control benefits of a long travel suspended frame for an off-road bicycle. These benefits result in higher attainable speeds in off-road riding than with suspension frames with lower torsional and out-of-plane bending stiffness. These benefits also result in higher attainable speeds in off-road riding than with traditional rigid frames due to the increase in comfort and control afforded by the suspension system of this invention. The preferred embodiment utilizes a minimum number of pivots, and the main frame pivot in this design is a low stress, widely spaced design which minimizes weight and maximizes frame stiffness. The pieces required by the preferred embodiment are easy to manufacture using standard industrial processes. The fact that moving parts are either enclosed or inherently corrosion and contamination resistant in the preferred embodiment makes this a robust design, well suited for dirty off-road environments. 10 to 20 cm of travel or more at the rear wheel is obtainable in the preferred embodiment. Finally, this bicycle frame design routes compressive pedaling forces through a rigid space frame type tubular member rear triangle, isolating pedaling forces from the action of the suspension.

The invention incorporates a number of features such as:
1. Compressive spring design, where spring is located in the position of the lower portion of the seat (derailleur) tube, slightly to the rear of the rider. The down tube shock may work a little better and be a little more robust, although heavier.
   a. location
   b. highly leveraged, 2 to 4 to I ratio to rear wheel
   c. sealed from elements
      i. weathering of Elastomer springs
      ii. fouling, wear and corrosion due to water and dirt
   d. lightweight
      i. housing also doubles as a necessary frame member
      ii. lightweight springs
      iii. lightweight damper
   e. Tandem, parallel action, high force, highly compressible, lightweight elastomers,
   f. Creating 10 cm or more of total rear wheel travel g. including about 10% of the travel in a negative spring
h. including a method for preloading the main spring against the negative spring.
i. including bayonet type spring retainer and screw tab lock.
2. Tensile spring design, where spring is located between the head tube and bottom bracket of the bicycle.
3. A stiff and lightweight mountain bike suspension frame.
4. Delaval variable (programmed) nozzle design damper connected in line with spring with through shaft. This type of damper operates with higher efficiency over a wider range of conditions than traditional dampers. Also far simpler in construction with many fewer parts than conventional dampers.
5. Main tube 60 with continuously varying wall thickness and variable cross-section along its length. Helps to achieve the high rigidity and lightweight test scores.
6. Pivot design with wide stance, large diameter, low stress design incorporating commercially available low static friction bearing material and hard anodized pivot surfaces.
7. Pivot location changes with frame size. (not per se unique).
8. Adjustable fitting location at bottom bracket for down tube spring design.
9. Pivot location as defined above. 33 degree angle from rear wheel axle, 1.5 to 1 travel ratio range, cross country to downhill. Other URT designs are 4 to I or more travel ratio. Most other suspension designs are I to 1 or close to it. The present invention preferably has a 2 to I ratio, and highly desirable. Ranges from 2 to I down towards 1 to 1.
10. Non pedal dive design, fully active. There is no mechanism to lock out the suspension in the present invention when the rider applies pedalling force.
11. Frame design where suspension spring is acting toward or in line with the BB shell (not unique, but structurally very efficient).
12. Frame and spring design where the frame geometry leverages the force on the spring compared to the rear wheel by 2.5 to one to 3.5 to one, combined with the microcellular elastomer spring which improves the response time of the suspension compared to not so highly leveraged microcellular elastomer springs.
13. Elastomer springs and or damper assembly held and protected in seat tube/front derailleur mounting tube/ tube attached to BB, retained with a quick release bayonet retainer, sealed with an elastomer boot. Advantages of improved Spring life and performance, clean mechanism.

KEY TO REFERENCE NUMERALS USED IN THE DRAWINGS

10 front wheel
20 rear wheel
30 frame
40 fork
50 head tube
60 main tube
70 seat retention tube
71 flange
80 down tube spring assembly
81 front fitting
82 rear fitting for firm progressive response
83 rear fitting for soft linear response
100 rear triangle assembly
110 left chain stay
111 front derailleur tube
115 right chain stay
120 left seat stay
121 left rear dropout
125 right seat stay
126 right rear dropout
130 left pivot strut
131 left pivot strut end fitting
132 left pivot boss
133 left pivot bushing
134L left pivot binder cap
134 R right pivot binder cap
135 right pivot strut
136 right pivot strut end fitting
137 right pivot boss
138 right pivot bushing
139 fastener
140 cross brace
150 bottom bracket
160 linkage
200 front derailleur tube spring assembly
  spring mechanism
  dashpot mechanism
201 housing tube
202 upper elastomeric spring
203 lower elastomeric spring
204 retaining ring
205 quick release cap
206 wear sleeve
207 quick release wedge
208 plunger
209 top out or rebound spring
210 liner
211 stopper
212 retaining ring
213 shaft
214 self-lubricating bushing
214B split ring
215 compressor disc
216 damper cylinder
217 valve body
218 retaining ring
219 ball seal
219A ball seal washer
220 self lubricating sleeve
221 cap
222 O-ring
223 lock pin Thus, the bicycle frame of this invention provides a competitive bicycle rider with a bicycle which is capable of travailing at high speeds over rough terrain while cushioning the rider from shock without sacrificing control or stability.

While the above description contains many specific details, these should not be construed as limitations on the scope of the invention, but rather as an exemplification of one preferred embodiment thereof. Many other variations are possible. For example, springs could be of another type such as pressurized gas, fiber reinforced composite, other elastomer, or metal. Damper mechanism B could use gas or electromagnetic force rather than hydraulic fluid to damp oscillation. Sealed ball bearings could be used in place of bushings 133 and 138, etc.

Accordingly, the scope of the present invention should be determined by the appended claims and their legal equivalents and not by the illustrated embodiment.

What is claimed is:

1. A bicycle frame suspension comprising a single, longitudinally extending main tube having fore and aft ends and left and right sides with a head tube secured to said fore end and a seat retention tube secured to said aft end, pivot bosses on the left and right sides of said main tube, said pivot bosses being spaced a distance D apart, D being at least 80 mm, a unitized rigid rear triangle assembly, said unitized rigid rear triangle assembly having a bottom bracket, left and right chain stay tubes having forward and trailing ends and a wheel dropout secured to each trailing end, respectively, with the forward ends secured to said bottom bracket, left and right seat stay tubes having ends secured to said dropouts, respectively, pivot strut assembly having upper and lower ends with said lower ends being secured to said bottom bracket, said upper end being provided with left and right bearing fittings which are horizon-tally spaced apart, said forward ends of said seat stay tubes being joined proximate said upper end of said pivot strut assembly, bearing assembly pivotally connecting said left and right bearing fittings on said main tube at said pivot bosses at said left and right sides, respectively, and proximate said aft end, a suspension spring assembly having a pair of ends, one end of said suspension spring assembly being connected to said bottom bracket and the other end of said suspension spring assembly being pivotally connected to one of said fore end of said main tube and said seat retention tube.

2. The invention defined in claim 1, wherein said suspension spring assembly includes a compressive spring.

3. The invention defined in claim 1 wherein said suspension spring assembly includes two or more coaxial elastomeric springs arranged such that said coaxial elastomeric springs operate in parallel.

4. A bicycle frame comprising in combination:
   (a) a main tube having fore and aft ends, a head tube secured to said fore end and a seat retention tube secured to said aft end,
   (b) a rear triangle frame assembly including a bottom bracket, two triangles and two spaced pivots,
   (c) a spring assembly secured to said bottom bracket, said spring assembly including two or more elastomeric springs connected coaxially with a plurality of internal stops and a plurality of push plates which make the springs act in parallel,
   (d) a pivot assembly on said main tube, the center of said pivot assembly is located at a predetermined location on said main tube proximate said aft end thereof, and
   (e) linkage means connecting said spring assembly to said seat retention tube.

5. The bicycle frame defined in claim 4, wherein said spring assembly is pivotally connected between said seat retention tube and said bottom bracket and includes a compression ring.

6. A bicycle frame suspension comprising a single substantially longitudinally extending main tube having fore and aft ends and left and right sides, a head tube secured to said fore end and a seat retention tube secured to said aft end, a rigid rear triangle assembly, said rigid rear triangle assembly being comprised of:
   a bottom bracket,
   a pair of chain stays having fore and aft ends with said fore ends being secured to said bottom bracket,
   a wheel dropout secured to the aft ends of each said chain stay, respectively,
   a pair of seat stays having fore and aft ends with the respective aft ends being secured to said dropouts, respectively,
   a vertically extending pivot strut assembly having an upper end and a lower end with said lower end being secured to said bottom bracket and said upper end having a pair of spaced pivot strut end fittings, the fore ends of said seat stays being secured to the upper end of said pivot strut assembly, and one of said pair of pivot strut fittings to the left side of the aft end of said main tube and the other of said pair of pivot strut fittings to the right side of the aft end of said main tube, and
   a spring assembly secured between said bottom bracket and a point connected to the aft end of said main tube.

* * * * *

UNITED STATES PATENT AND TRADEMARK OFFICE
CERTIFICATE OF CORRECTION

PATENT NO.     : 6,109,636
DATED          : August 29, 2000
INVENTOR(S)    : Klein et al.

It is certified that error appears in the above-identified patent and that said Letters Patent is hereby corrected as shown below:

<u>Title page,</u>
Insert -- [*] Notice: Under 35 U.S.C. 154(b), the term of this patent shall be extended for 352 days. --.

Signed and Sealed this

Eighth Day of July, 2003

JAMES E. ROGAN
*Director of the United States Patent and Trademark Office*